US008402308B2

(12) United States Patent
Chae et al.

(10) Patent No.: US 8,402,308 B2
(45) Date of Patent: Mar. 19, 2013

(54) APPARATUS AND METHOD FOR FAILURE MANAGEMENT OF RFID MIDDLEWARE MANAGEMENT SYSTEM

(75) Inventors: Heung-Seok Chae, Seoul (KR); Kwang-Su Lee, Busan (KR); Hyun-Suk Baek, Seongnam-si (KR)

(73) Assignee: Pusan National University Industry-University Cooperation Foundation, Busan (KR)

( * ) Notice: Subject to any disclaimer, the term of this patent is extended or adjusted under 35 U.S.C. 154(b) by 744 days.

(21) Appl. No.: 12/607,152

(22) Filed: Oct. 28, 2009

(65) Prior Publication Data
US 2010/0214075 A1 Aug. 26, 2010

(30) Foreign Application Priority Data
Feb. 24, 2009 (KR) ........................ 10-2009-0015261

(51) Int. Cl.
*G06F 11/00* (2006.01)
(52) U.S. Cl. .................... 714/15; 340/572.1; 340/572.3; 235/432; 235/462.1; 235/462.13
(58) Field of Classification Search .................. 235/432, 235/462.1, 462.13; 340/572.1, 572.3
See application file for complete search history.

(56) References Cited

U.S. PATENT DOCUMENTS

| | | | | |
|---|---|---|---|---|
| 2004/0113791 | A1* | 6/2004 | Salim et al. | 340/572.3 |
| 2007/0152822 | A1* | 7/2007 | Eren et al. | 340/572.1 |
| 2009/0167531 | A1* | 7/2009 | Ferguson | 340/572.1 |

OTHER PUBLICATIONS

Wang, "Demonstration of an RFID Middleware: LIT ALE Manager", Sep. 4, 2009, Pusan National University, pp. 1-2.*
Kang, "Design and Implementation of ALE v1.1 Middleware in RFID systems", Jun. 9, 2009, IEEE, pp. 815-821.*
Ravindran, "Resource Management Middleware for Dynamic, Dependable Real-Time Systems", Mar. 22, 1999, Kluwer, pp. 1-15.*
Kwon, "RFID-Based ALE Application Framework Using Context-Based Security Service", Mar. 24, 2006, Springer-Verlag, pp. 1042-1051.*
Gu, "RFID-Based Locating Management", Mar. 4, 2008, IEEE, pp. 18-23.*
Lim et al., Study of Performance Fault Diagnosis Approach . . . , Journal of the Korean Institute of Information Scientists and Engineers Fall Conference, vol. 34, No. 2(B), 2007.

* cited by examiner

*Primary Examiner* — Scott Baderman
*Assistant Examiner* — Jeison C Arcos
(74) *Attorney, Agent, or Firm* — Sherr & Jiang, PLLC

(57) ABSTRACT

An object of the present invention is to provide apparatus and method for failure management of a RFID middleware management system for providing optimum failure detection and restoring technologies to the RFID middleware management system for supporting more exquisite and faster failure detection and restoration. The apparatus for failure management of a RFID middleware management system includes a plurality of readers each for sensing and reading in a tag data, a plurality of RFID middlewares each for processing the tag data from the readers through processing steps of collection, classification, and transferring a result of the processing to an application in a fixed format, and an MMS (middleware management system) for detecting a failure taken place at the RFID middlewares, and performing at least one of re-starting and work shifting to restore the RFID middleware from the failure detected thus.

10 Claims, 10 Drawing Sheets

APPARATUS AND METHOD FOR FAILURE MANAGEMENT OF RFID MIDDLEWARE MANAGEMENT SYSTEM

CROSS REFERENCE TO PRIOR APPLICATIONS

This application claims priority to Korean Patent Application No. 10-2009-0015261 (filed on Feb. 24, 2009) which is hereby incorporated by reference in its entirety.

BACKGROUND OF THE DISCLOSURE

1. Field of the Disclosure

The present invention relates to RFID middleware systems, and, more particularly, to apparatus and method for failure management of a RFID middleware management system, for detecting a failure taken place at a RFID middleware and reporting to an application for restoring the system from the failure.

2. Discussion of the Related Art

The RFID middleware is a software system for collecting and refining a large amount of data produced in a RFID environment of different machines, summarizing the data into valuable information, and transferring the data to an application system. Accordingly, the RFID middleware is connected to a plurality of RFID readers which read in sensed tag data, for receiving the tag data at regular time intervals. The RFID middleware is also connected to the application system for receiving information on the RFID readers which require the tag data, and information on required processing methods. The RFID middleware takes a process of collection, classification, and so on of the tag data received from the RFID readers thus, and transfers a result of the process to the application system.

Thus, the RFID middleware serves as a client which demands the tag data from the RFID readers, as well as a server to the application system which requests the tag data.

Recently, as embodiments of functions of the RFID middleware become substantial, importance on management of the RFID middleware management system becomes high. According to this, though the RFID middleware uses one high performance middleware server, in cases of harbor logistics, a plurality of various middleware servers each having various kinds of readers and devices attached thereto are used.

In the meantime, due to failure taken place at the RFID middleware, the RFID application performs a business process based on an imperfect data, impairing effectiveness of the process of the middleware. Therefore, failure management is required for improvement of performance of the RFID middleware, positively.

However, because standardization on management of the RFID middleware system has not been made yet, home and abroad, and passive management of the RFID middleware system is being made, not only detection of the failure is very difficult for a manager even if the failure is taken place, but also restoration from the failure is inconvenient even if the failure is detected, because all of the restoration work is required to be made one by one manually for restoring from the failure. Consequently, in the RFID middleware system management, maintenance is difficult and expenses are increasing.

SUMMARY OF THE DISCLOSURE

Accordingly, the present invention is directed to apparatus and method for failure management of a RFID middleware management system.

An object of the present invention is to provide apparatus and method for failure management of a RFID middleware management system for providing optimum failure detection and restoring technologies to the RFID middleware management system for supporting more exquisite and faster failure detection and restoration.

Another object of the present invention is to provide apparatus and method for failure management of a RFID middleware management system for detecting failures taken place at a RFID middleware by real time monitoring, classifying the failures into interruption, reporting omission and reporting delay, reporting the failures to an application, and restoring the failures by re-starting or work shifting.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for failure management of a RFID middleware management system includes a plurality of readers each for sensing and reading in a tag data, a plurality of RFID middlewares each for processing the tag data from the readers through processing steps of collection, classification, and transferring a result of the processing to an application in a fixed format, and an MMS (middleware management system) for detecting a failure taken place at the RFID middlewares, and performing at least one of re-starting and work shifting to restore the RFID middleware from the failure detected thus.

The failure detected is at least one of failure types of interruption, reporting omission, and reporting delay.

In another aspect of the present invention, a method for failure management of a RFID middleware management system includes the steps of (A) detecting failures taken place at a RFID middleware with the failures classified in failure types based on ECReport reporting between the RFID middleware and an application, and (B) restoring the RFID middleware from the types of the failures by at least one of re-starting and work shifting.

The types of failures in (A) step includes a failure of interruption which is reporting of the ECReport to the application is failed due to failure of the reader or the RFID middleware, a failure of reporting omission which is reporting of only some of the ECReports the RFID middleware produced to the application, and a failure of reporting delay which is reporting of the ECReport by the RFID middleware to the application later than a repeatPeriod defined at an ECSpec.

The (A) step includes the steps of transmitting information on production of the ECReport from the RFID middleware to the MMS, and the MMS detecting the failure, classifying failure information into types of failures of interruption, reporting omission, and reporting delay based on the information received thus.

The (B) step includes the steps of a manager performing re-starting of a first RFID middleware having the failure detected, and re-starting the RFID middleware interrupted thus to restore the RFID middleware from the failure in a defined time period is passed after the interruption.

The (B) step includes the steps of disconnecting all of the readers from the first RFID middleware having the failure detected, after the disconnection, connecting the readers disconnected thus to the second RFID middleware to which the work is to be transferred, after connecting all of the readers, registering LogicalReader, and ECSpec of the first RFID middleware at the second RFID middleware, if the LogicalReader, and ECSpec registered thus are transferred to the second RFID middleware, performing the work at the second RFID middleware, and stopping the first RFID middleware having the failure taken place to work, and performing rest of the work at the second RFID middleware having the work received thus, thereby resorting from the failure.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DESCRIPTION OF SPECIFIC EMBODIMENTS

Reference will now be made in detail to the specific embodiments of the present invention, examples of which are illustrated in the accompanying drawings. Wherever possible, the same reference numbers will be used throughout the drawings to refer to the same or like parts.

Apparatus and method for failure management of a RFID middleware management system in accordance with preferred embodiment of the present invention will be described with reference to attached drawings. However, the present invention is, not limited to the embodiment disclosed hereinafter, but variations different from one another can be made. The embodiment is provided for informing scope of the present invention completely to those skilled in the art. Accordingly, since the embodiment described in the specification and the system shown in the drawings is, no more than the most preferred embodiment of the present invention, but does not represent all of the technical aspects of the present invention, is required to understand that there can be various equivalents and variations that can substitute the embodiment at the time of application of the present invention. Hereinafter, types of failures are defined putting emphasis on ECReport between a RFID middleware and an application, and metric on the ECReport is defined.

Figure 1:
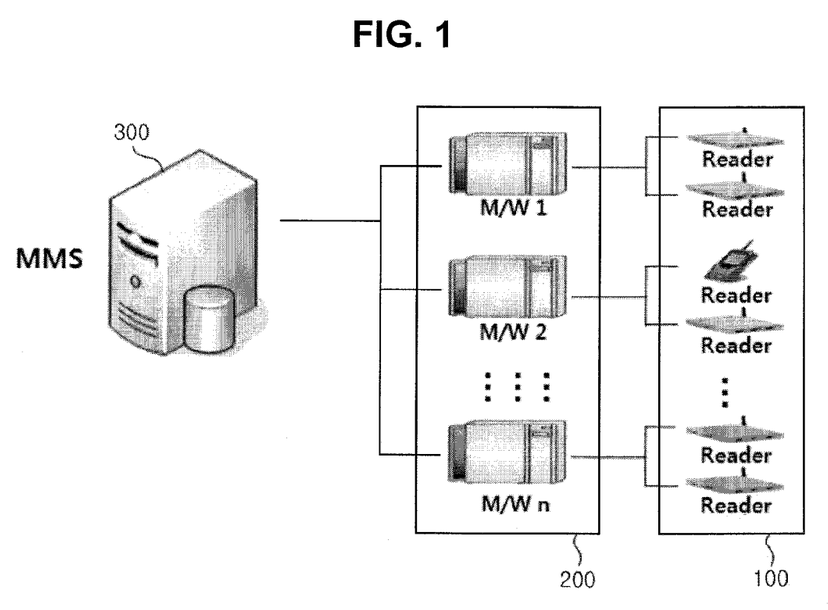
FIG. 1 illustrates a block diagram of a failure management apparatus for a RFID middleware management system in accordance with a preferred embodiment of the present invention.

FIG. 1 illustrates a block diagram of a failure management apparatus for a RFID middleware management system in accordance with a preferred embodiment of the present invention.

Referring to FIG. 1, the failure management apparatus includes a plurality of readers 100 each for sensing and reading in a tag data, a plurality of RFID middlewares 200 each for processing the tag data from the readers 100 through processing steps of collection, classification, and so on, and transferring a result of the processing to an application (not shown) in a fixed format, and an MMS (middleware management system) 300 for detecting a failure taken place at the RFID middlewares 200 by real time monitoring, and performing at least one of re-starting and work shifting to restore the RFID middleware from the failure. There are the failure of the reader and the failure of the middleware in the failures that can take place at the RFID middleware 200, wherein the failure of the reader is a failure of the reader 100 in processing a RFID tag (not shown), and the failure of the middleware is a failure of transfer of the information the reader 100 read to an upper layer.

The failure of reader and the failure of the middleware taken place at the RFID middleware 200 produce three failure types of interruption, reporting omission, and reporting delay. The failure of interruption is a failure of making the ECReport to the application (not shown) which is the upper layer of the RFID middleware 200 due to the failure of the reader 100 or the RFID middleware 200, the failure of reporting omission is reporting of only some of the ECReports the RFID middleware 200 produced to the application, and the failure of reporting delay is reporting of the ECReport by RFID middleware 200 to the application later than a repeatPeriod defined at an ECSpec.

Figure 2:
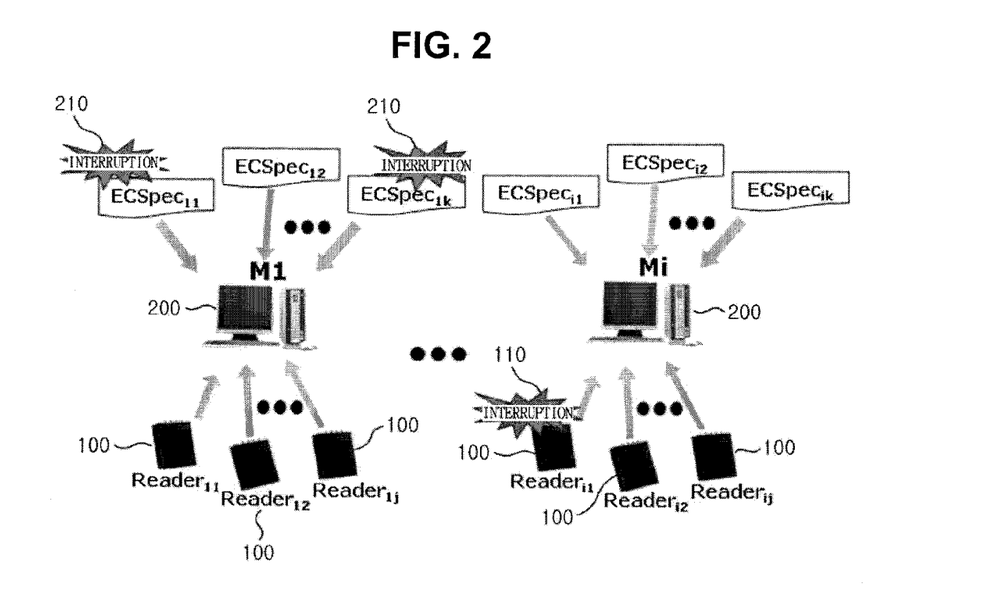
FIG. 2 illustrates a block diagram for describing a failure of interruption in types of RFID middleware failures.

FIG. 2 illustrates a block diagram for describing a failure of interruption in types of RFID middleware failures.

Referring to FIG. 2, in the failures of interruption, there are a case of a failure of making the ECReport to the application (not shown) due to failure of production of the ECReport caused by a failure 210 of the RFID middleware 200, and a case of a failure of making the ECReport to the application due to failure of the RFID middleware 200 in collection of the tag data from the reader 100 caused by failure of the reader.

If a ratio of failures of making the ECReport due to failure of the reader 100 or the RFID middleware 200 is called as a cluster interruption ratio, the cluster interruption ratio can be defined as an equation 1, below.

$$\sum_{i=0}^{n}\left(\frac{\sum_{k=1}^{ki}F(ECSpec_{ik})}{|Ei|}\times\frac{\sum_{j=1}^{Rj}F(Reader_{ij})}{|Ri|}\right) \quad (1)$$

Where, Ei denotes a number of ECSpecs, and Ri denotes a number of the readers. F(ECSpec) denotes a number of failures taken place at the ECSpec, and F(Reader) denotes a number of failures taken place at the Reader. Therefore, referring to equation 1, if the failure takes place at the RFID middleware, F(ECSpec)=1, and if the failure takes place at the reader, F(Reader)=1. Thus, by using the ratio of failed ECSpecs to all ECSpecs and the ratio of failed readers to all readers, the cluster interruption ratio is calculated.

In order to diagnose the failures of interruption in clusters more accurately like equation 1, a middleware interruption ratio is measured in metric. That is, the middleware interruption ratio which is a value measured at each of the middlewares is a ratio of failures of reporting by the ECReport caused by failures of the reader or the RFID middleware of the RFID middleware system. The middleware interruption ratio can be defined as an equation 2, below.

$$\frac{\sum_{k=1}^{|Fk|}F(ECSpec_{ik})}{|Ei|}\times\frac{\sum_{j=1}^{|Fj|}F(Reader_{ij})}{|Ri|} \quad (2)$$

Figure 3:
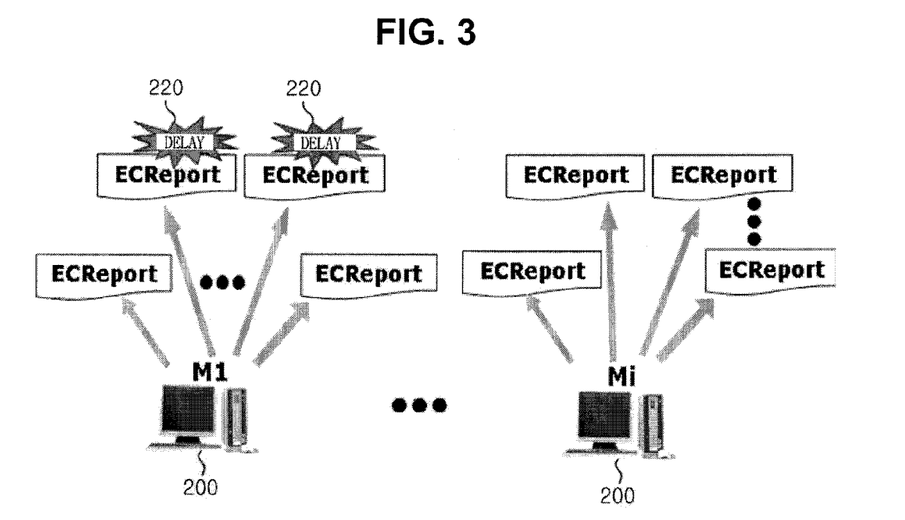
FIG. 3 illustrates a block diagram for describing a failure of reporting omission in types of RFID middleware failures.

FIG. 3 illustrates a block diagram for describing a failure of reporting omission in types of RFID middleware failures.

Referring to FIG. 3, the failure of reporting omission is a case 220 of failure of reporting of some of the failures of the ECReports from the RFID middleware to the application.

If a ratio of omitted ECReports in all of the ECReports required to be reported in the RFID middleware system is called as a cluster reporting omission, the ratio of the cluster reporting omission can be defined as an equation 3, below.

$$\sum_{i=1}^{n}\frac{|OR_i|}{|ER_i|} \quad (3)$$

Where, $ER_i$ denotes a number of the ECReports required to be reported to the application from the RFID middleware, $AR_i$ denotes a number of the ECReports reported to the application from the RFID middleware 200, and $OR_i$ denotes a number of omitted ECReports, i.e., $OR_i=ER_i-AR_i$.

Then, the ratio of the cluster reporting omission can be calculated by applying $OR_i/ER_i$ to all of the middlewares.

The middleware reporting omission ratio and a middleware omission inducing ratio metric are used for diagnosis of the reporting omission failure. In this instance, the middleware reporting omission ratio which is a value measured at each of the middlewares is a ratio of the ECReports reporting of which is omitted to all of the ECReports required to be reported from the RFID middleware 200 to the application, and the middleware omission inducing ratio is a ratio of influence of the RFID middlewares given to the cluster reporting omission ratio in all of the reporting omissions.

The middleware reporting omission ratio can be defined as an equation 4 below, and the middleware omission inducing ratio can be defined as an equation 4, below.

$$\frac{|OR_i|}{|ER_i|} \quad (4)$$

$$\frac{|OR_i|}{\sum_{i=1}^{n}|OR_i|} \quad (5)$$

Thus, the middleware omission inducing ratio is a ratio of the ECReports omitted from one of the middlewares to the ECReports omitted from all of the clusters.

Figure 4:
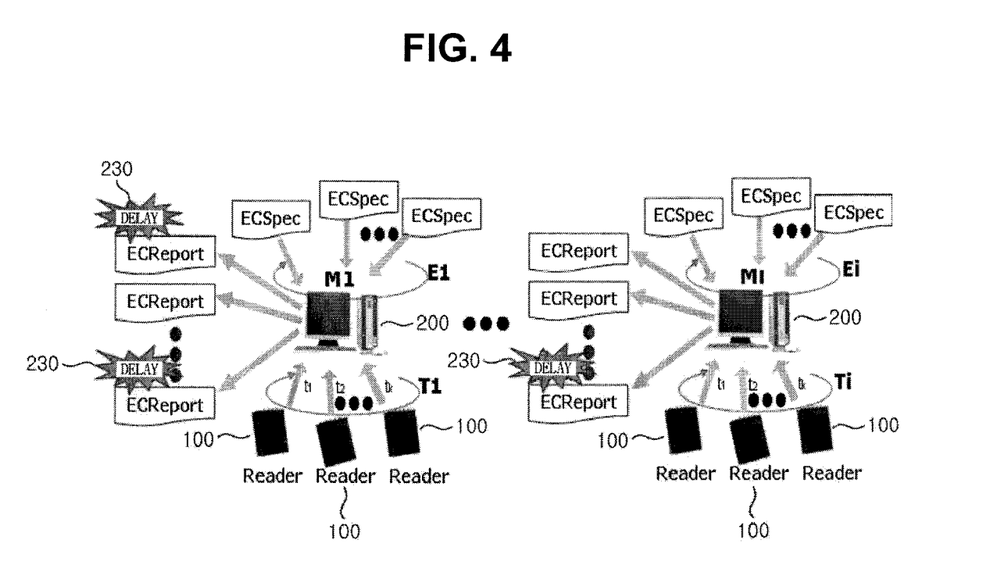
FIG. 4 illustrates a block diagram for describing a failure of reporting delay in types of RFID middleware failures.

FIG. 4 illustrates a block diagram for describing a failure of reporting delay in types of RFID middleware failures.

Referring to FIG. 4, the ECReports from the RFID middleware 200 is reported to the application an every repeatPeriod defined at the ECSpec. In a case 230 the ECReport is not made at every repeatPeriod, the failure of reporting delay is taken place.

A ratio of the ECReports failed to report at designated repeatPeriod to reported ECReports is called as a cluster delayed reporting ratio. The cluster delayed reporting ratio can be defined as an equation 6, below.

$$\sum_{i=1}^{n}\frac{|DR_i|}{|AR_i|} \quad (6)$$

Where, $AR_i$ denotes a number of the ECReports reported from the RFID middleware 200, and $DR_i$ denotes a number of ECReports reported later than the designated reporting time. The cluster reporting omission ratio is calculated by applying $DR_i/AR_i$ as shown in equation 6 to all of the middlewares.

If a ratio of the ECReports failed to report from the RFID middleware 200 to the application at the repeatPeriod measured at each of the middlewares is called as a middleware delayed reporting ratio, the middleware delayed reporting ratio can be defined as an equation 7, below.

$$\frac{|DR_i|}{|AR_i|} \quad (7)$$

Then, as described before, if the failures of interruption, reporting omission, reporting delay, and so on taken place at the RFID middleware system are detected, the MMS (Middleware Management System) 100 restores the RFID middleware system from the failures by re-starting and work shifting. The MMS 100 can help the RFID middleware system to perform required work without interruption by such restoration of the RFID middleware system from the failures.

Figure 5:
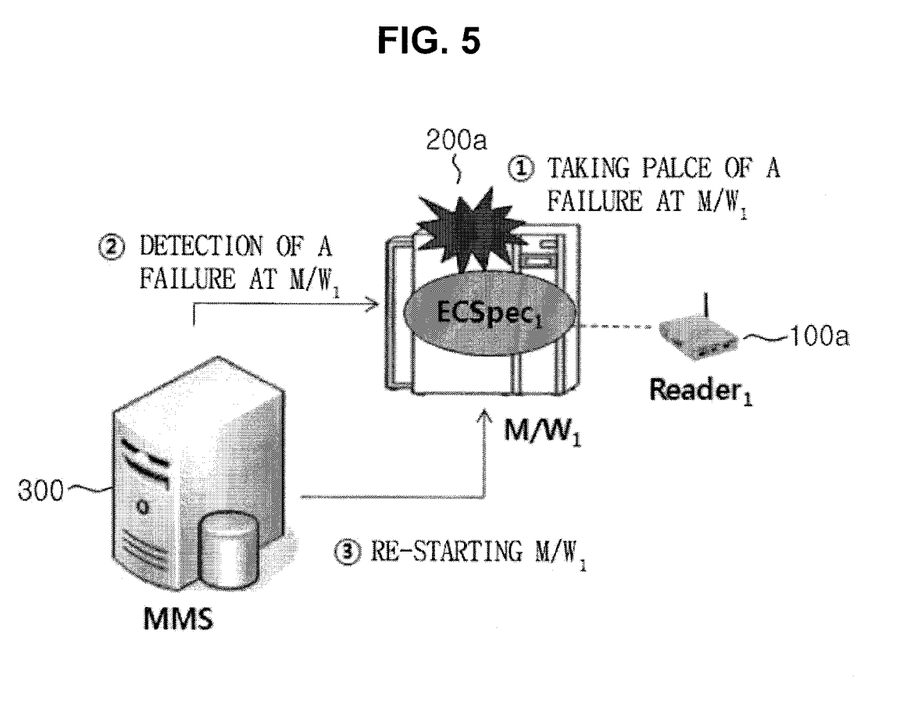
FIG. 5 illustrates a block diagram for describing a RFID middleware failure detection and restoring from the failure by re-starting the RFID middleware in accordance with a preferred embodiment of the present invention.

FIG. 5 illustrates a block diagram for describing a RFID middleware failure detection and restoring from the failure by re-starting the RFID middleware in accordance with a preferred embodiment of the present invention.

Referring to FIG. 5, if the failure takes place at the first RFID middleware 200a, and the MMS 300 detects the failure at the first RFID middleware 200a, in order to restore the first RFID middleware 200a from the failure, the MMS 300 gives a re-starting order to the RFID middleware 200a so that the RFID middleware 200a re-starts for itself, to restore the RFID middleware 200a from the failure.

Figure 6:
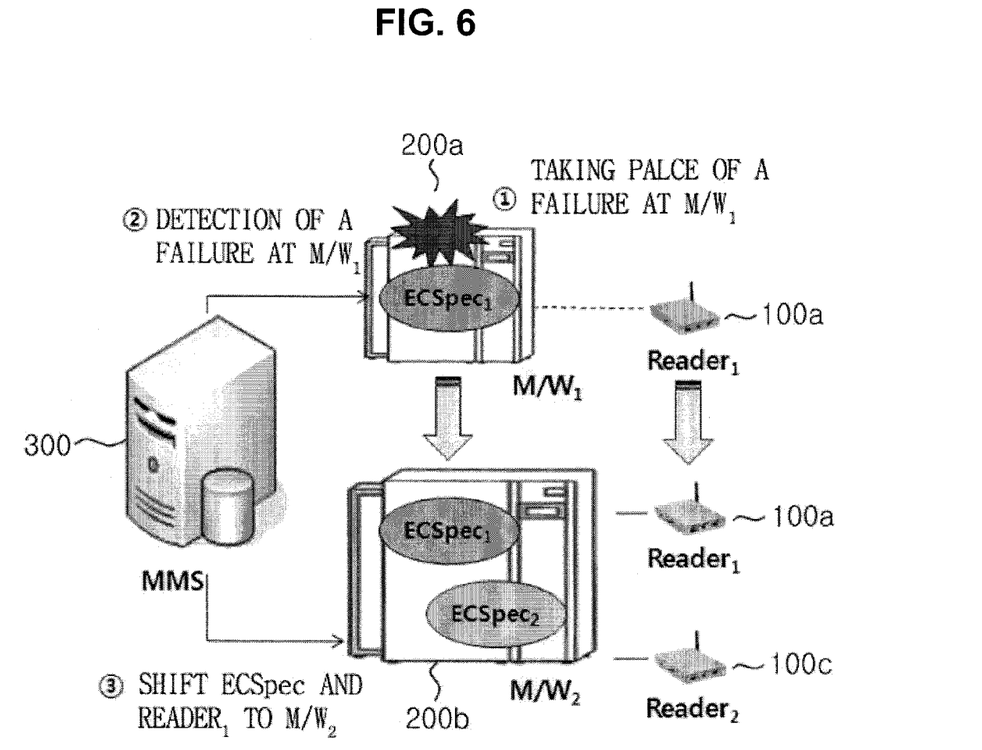
FIG. 6 illustrates a block diagram for describing a RFID middleware failure detection and restoring from the failure by work shifting in accordance with a preferred embodiment of the present invention.

In this instance, the restoration from the failure by re-starting for itself can fail, and if the restoration from the failure is not successful, as shown in FIG. 6, the restoration from the failure can be made by work shifting in which work is shifted to another middleware.

FIG. 6 illustrates a block diagram for describing a RFID middleware failure detection and restoring from the failure by work shifting in accordance with a preferred embodiment of the present invention.

Referring to FIG. 6, if the failure takes place at the first RFID middleware 200, and the MMS 300 detects the failure at the first RFID middleware 200a, in order to restore the first RFID middleware 200a from the failure, the MMS 300 shifts the work to a second RFID middleware 200b which has no failure taken place. Then, if the first RFID middleware 200a shifts all works (ECSpec and reader 100a) to the second RFID middleware 200b, any work is not performed at the first RFID middleware 200a. By making all works of the first RFID middleware 200a to be performed at the second RFID middleware 200b, the restoration from the failure can be made.

For reference, the RFID middleware 200 is the ALEManager3.0 developed by the LIT (Institute of Logistics Information Technology). The failure can be managed by interface between the ALEManager3.0 and the LitAgent.

Figure 7:
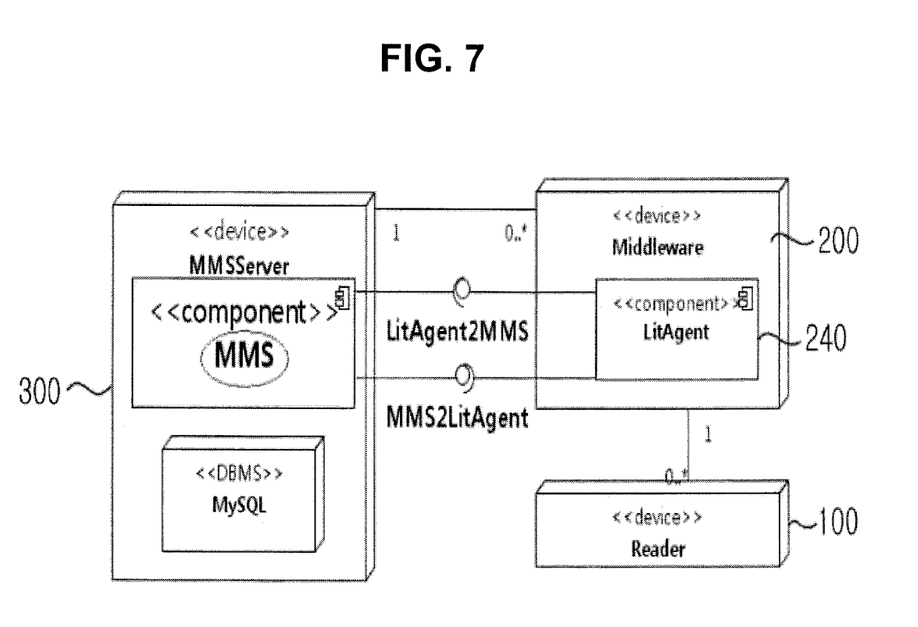
FIG. 7 illustrates a block diagram showing architecture of a failure management apparatus for a RFID middleware management system in accordance with a preferred embodiment of the present invention.

FIG. 7 illustrates a block diagram showing architecture of a failure management apparatus for a RFID middleware management system in accordance with a preferred embodiment of the present invention.

Referring to FIG. 7, the MMS 300 makes communication with the LitAgent 240 in the RFID middleware 200 through two interfaces of LitAgent2MMS and MMS2LitAgent. Through the interfaces, the MMS manages a configuration of the RFID middleware 200 and the reader 100, and can collect information required for calculating information on the failures. In this instance, the information collected thus is calculated and stored classified by types.

The LitAgent 240 exists at a node the same with the RFID middleware 200 and communicates with the RFID middleware 200, directly. The LitAgent 240 also receives information from the MMS 300 and transfers the information to the RFID middleware 200, and vice versa.

The operation of the apparatus for failure management of a RFID middleware management system will be described in detail with reference to the attached drawings.

As a first step, based on ECReports between the RFID middleware and the application, the failures taken place at the RFID middleware 200 are detected in types of failures of interruption, reporting omission, and reporting delay.

Figure 8:
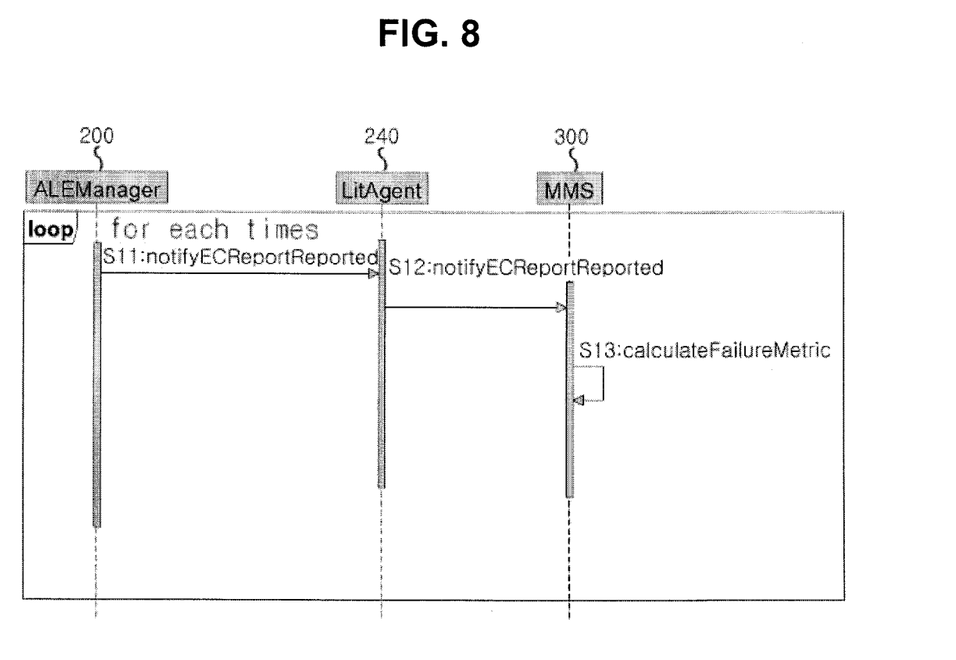
FIG. 8 illustrates a flow chart for describing a failure detection method in a failure management method for a RFID middleware management system in accordance with a preferred embodiment of the present invention.

FIG. 8 illustrates a flow chart for describing a failure detection method in a failure management method for a RFID middleware management system in accordance with a preferred embodiment of the present invention.

Referring to FIG. 8, in the method for detecting the failure, information on taking place of an ECReport is transmitted to an MMS 300 from an RFID middleware (ALEManger) 200 through the LitAgent 240 (S11~S12). Then, as described before, the MMS 300 calculates failure information, classifying the failure information into three types of failures of interruption, reporting omission, and reporting delay, periodically by using equations 1 to 7 for detecting the failure (S13).

As a second step, the RFID middleware 200 failure detected in the first step is restored by least one of re-starting and work shifting.

Figure 9:
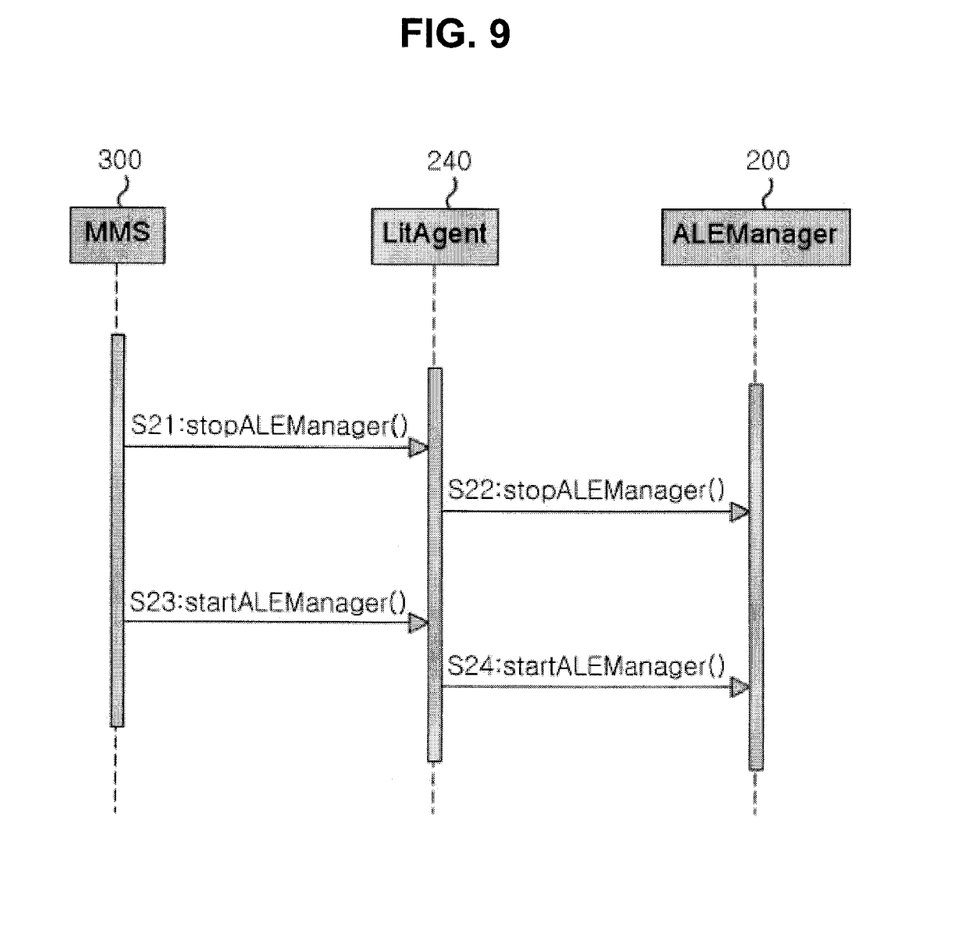
FIG. 9 illustrates a flow chart for describing a method for restoring from a failure by re-starting in a failure management method for a RFID middleware management system in accordance with a preferred embodiment of the present invention.

FIG. 9 illustrates a flow chart for describing a method for restoring from a failure by re-starting in a failure management method for a RFID middleware management system in accordance with a preferred embodiment of the present invention.

Referring to FIG. 9, if a manager re-starts the first RFID middleware 200 having the failure detected, the first RFID middleware 200 having the failure detected is turned off through an MMS 300, an LitAgent 240, and the first RFID middleware 200 (S21~S22). Upon passing a defined time period after turned off, the MMS 300 re-starts the first RFID middleware 200 turned off thus (S23~S24). Thus, by re-starting the first RFID middleware 200 having the failure detected after leaving stationary for a preset time period, the MMS 300 restores the first middleware from the failure.

In this instance, the restoration from the failure by re-starting for itself can fail, and if the restoration from the failure is not successful, the restoration from the failure can be made by work shifting in which work is shifted to another middleware.

Figure 10:
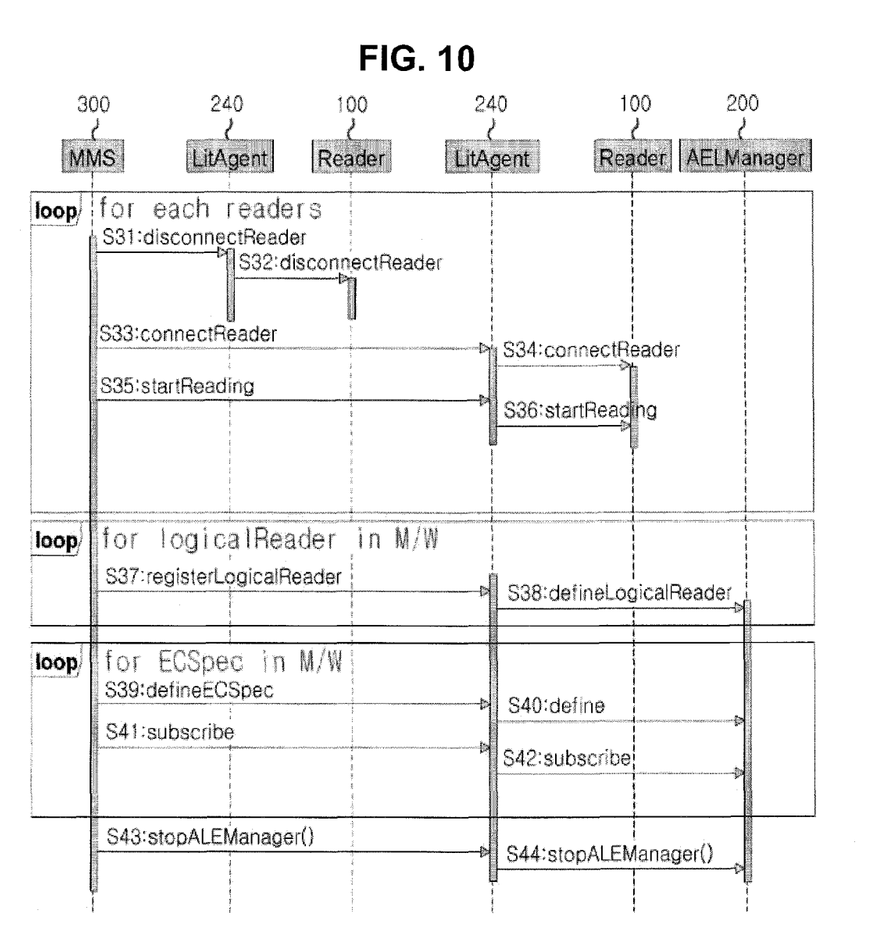
FIG. 10 illustrates a flow chart for describing a method for restoring from a failure by work shifting in a failure management method for a RFID middleware management system in accordance with a preferred embodiment of the present invention.

FIG. 10 illustrates a flow chart for describing a method for restoring from a failure by work shifting in a failure management method for a RFID middleware management system in accordance with a preferred embodiment of the present invention.

Referring to FIG. 10, after disconnecting all of the readers 100 from the first RFID middleware 200a having the failure detected (S31~S32), all of the readers 100 disconnected thus are connected to the second RFID middleware 200b to which the work is to be transferred (S33~S40).

Then, after shifting to the second middleware 200b having all of the readers 100 connected thereto (S37~S38), in order to shift actual work from the first RFID middleware 200a to the second RFID middleware 200b, LogicalReader, and ECSpec are registered at the second RFID middleware 200b (S35~S40). If the LogicalReader, and ECSpec registered thus are transferred to the second RFID middleware, the work is performed at the second RFID middleware 200b.

Then, the first RFID middleware 200a having the failure taken place is stop working, and the second RFID middleware 200b having the work received thus performs rest of the work, thereby resorting from the failure (S43~S44).

As has been described, the apparatus and method for failure management of a RFID middleware management system of the present invention have the following advantages.

Firstly, by providing a failure detection and restoring technology optimized to an RFID system, not a general failure detection and restoring technology for a distributed system, more exquisite and faster failure detection and restoration can be supported by reflecting a unique characteristic of the RFID middleware system.

Secondly, by providing the RFID middleware system to be managed of the failures in realtime, response to the failures can be made, quickly.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An apparatus for failure management of a RFID middleware management system comprising:
a plurality of readers each for sensing and reading in a tag data;
a plurality of RFID middlewares each for processing the tag data from the readers through processing steps of collection, classification, and transferring a result of the processing to an application in a fixed format; and
an MMS (middleware management system) for detecting a failure taken place at the RFID middlewares, and performing at least one of re-starting and work shifting to restore the RFID middleware from the failure detected thus, wherein the MMS makes communication with an LitAgent in the RFID middleware through two interfaces of LitAgent2MMS and MMS2LitAgent, to manage a configuration of the RFID middleware and the reader, and collect information required for calculating information on the failures.

2. The apparatus as claimed in claim 1, wherein the failure taken place at the RFID middleware is at least one of failures of the reader and the middleware.

3. The apparatus as claimed in claim 1, wherein the failure detected is at least one of failure types of interruption, reporting omission, and reporting delay.

4. The apparatus as claimed in claim 1, wherein the LitAgent exists at a node the same with the RFID middleware, communicates with the RFID middleware directly, receives information from the MMS and transfers the information to the RFID middleware, and vice versa.

5. A method for failure management of a RFID middleware management system comprising the steps of:
  (A) detecting failures taken place at a RFID middleware with the failures classified in failure types based on ECReport reporting between the RFID middleware and an application; and
  (B) restoring the RFID middleware from the types of the failures by at least one of re-starting and work shifting,
  wherein the types of failures in (A) step includes;
  a failure of interruption which is reporting of the ECReport to the application is failed due to failure of the reader or the RFID middleware,
  a failure of reporting omission which is reporting of only some of the ECReports the RFID middleware produced to the application, and
  a failure of reporting delay which is reporting of the ECReport by the RFID middleware to the application later than a repeat period defined at an ECSpec.

6. The method as claimed in claim 5, wherein the (A) step includes the steps of;
  transmitting information on production of the ECReport from the RFID middleware to the MMS, and
  the MMS detecting the failure, classifying failure information into types of failures of interruption, reporting omission, and reporting delay based on the information received thus.

7. The method as claimed in claim 5, wherein the failure of interruption is calculated by using an equation $$\frac{\sum_{k=1}^{|Fk|} F(ECSpec_{ik})}{|Ei|} \times \frac{\sum_{j=1}^{|Fj|} F(Reader_{ij})}{|Ri|},$$

which is an equation for calculating a middleware interruption ratio that is a ratio of failure of reporting by RCReport caused by failure of the reader or the RFID middleware, where, Ei denotes a number of ECSpecs, and Ri denotes a number of the readers. F(ECSpec) denotes a number of failures taken place at the ECSpec, and F(Reader) denotes a number of failures taken place at the Reader.

8. The method as claimed in claim 5, wherein the failure of reporting delay is calculated by using an equation $$\sum_{i=1}^{n} \frac{|DR_i|}{|AR_i|},$$

which is an equation for calculating a cluster delayed reporting ratio which is a ratio of the ECReport failed to report at a designated repeatPeriod in the reported ECReport, where $AR_i$ denotes a number of the ECReports reported from the RFID middleware, and $DR_i$ denotes a number of ECReports reported later than the designated reporting time.

9. The method as claimed in claim 5, wherein the (B) step includes the steps of;
  a manager performing re-starting of a first RFID middleware having the failure detected, and
  re-starting the RFID middleware interrupted thus to restore the RFID middleware from the failure in a defined time period is passed after the interruption.

10. The method as claimed in claim 5, wherein the (B) step includes the steps of;
  disconnecting all of the readers from the first RFID middleware having the failure detected,
  after the disconnection, connecting the readers disconnected thus to the second RFID middleware to which the work is to be transferred,
  after connecting all of the readers, registering LogicalReader, and ECSpec of the first RFID middleware at the second RFID middleware,
  if the LogicalReader, and ECSpec registered thus are transferred to the second RFID middleware, performing the work at the second RFID middleware, and
  stopping the first RFID middleware having the failure taken place to work, and performing rest of the work at the second RFID middleware having the work received thus, thereby resorting from the failure.

* * * * *